United States Patent [19]

Benton

[11] Patent Number: 5,360,122
[45] Date of Patent: Nov. 1, 1994

[54] STORAGE RACK WITH READILY ACCESSIBLE WIRE TRACK BEAM

[75] Inventor: Richard E. Benton, Springfield, Tenn.

[73] Assignee: UNR Industries, Inc., Chicago, Ill.

[21] Appl. No.: 172,435

[22] Filed: Dec. 23, 1993

Related U.S. Application Data

[63] Continuation-in-part of Ser. No. 61,214, May 13, 1993, Pat. No. 5,279,430.

[51] Int. Cl.$^5$ ............................................. A47F 5/00
[52] U.S. Cl. .................................. 211/151; 211/59.2; 211/187
[58] Field of Search .................. 211/151, 59.2, 187, 211/186, 153, 26

[56] References Cited

U.S. PATENT DOCUMENTS

| | | | |
|---|---|---|---|
| 3,900,112 | 8/1975 | Azzi et al. | 211/151 X |
| 4,372,451 | 2/1983 | Rasmussen et al. | 211/187 |
| 4,383,614 | 5/1983 | Miller | 211/151 X |
| 4,394,910 | 7/1983 | Miller | 211/151 X |
| 4,453,641 | 6/1984 | Rasmussen et al. | 211/187 X |
| 4,553,674 | 11/1985 | Yoshikawa et al. | 211/26 |
| 4,765,493 | 8/1988 | Kinney | 211/151 X |
| 5,090,547 | 2/1992 | Shäfer | 211/151 X |
| 5,114,016 | 5/1992 | Todd | 211/26 |
| 5,115,920 | 5/1992 | Tipton et al. | 211/151 X |
| 5,201,429 | 4/1993 | Hikosaka et al. | 211/59.2 |
| 5,259,518 | 11/1993 | Sorenson et al. | 211/151 X |
| 5,279,430 | 1/1994 | Benton | 211/151 |

Primary Examiner—Robert W. Gibson, Jr.
Attorney, Agent, or Firm—Dressler, Goldsmith, Shore & Milnamow, Ltd.

[57] ABSTRACT

A storage rack with a front beam having a readily accessible wire track formed therein is disclosed. The storage rack comprises front and rear beams which are inverted generally V-shaped channels which roll on to side beams to form the shelf. The front and rear beams are secured into the side beams by interlocking projections and notches. The front and rear beams can span one or more bays of storage racks and a use simplified design to facilitate assembly. The front beam has an external lip which terminates in an upturned wall. The beam is continuous across one or more bays or racks and provides an accessible track for wire or cable to traverse a part of, or the entire length of the storage rack. The front beam further includes a lock-in angle plate mounted to the top thereof. A wire or cable traversing the beam can connect electronic panels which slide or snap into the front of the beam between the upturned wall and the angle plate. Blank panels can also be installed on the front of the beam to provide substantially continuous covering of the wire track by the electronic panels or blank panels to protect the wires traversing the wire track.

13 Claims, 2 Drawing Sheets

STORAGE RACK WITH READILY ACCESSIBLE WIRE TRACK BEAM

CROSS REFERENCE TO RELATED APPLICATION

This application is a continuation-in-part of U.S. patent application Ser. No. 08/061,214, filed May 13, 1993, now U.S. Pat. No. 5,279,430, for STORAGE RACK WITH WIRE TRACK BEAM, assigned commonly herewith.

FIELD OF THE INVENTION

This invention pertains to storage racks; more particularly, this invention pertains to a storage rack with a novel, continuous, front beam which can span one or more bays of the storage rack, which can be installed through a simple roll-on action, and which can define a wire track within the beam which is readily accessible from the front of the beam and which is used with associated electronic and blank front panels.

BACKGROUND OF THE INVENTION

Storage racks are commonly known in the art. Variations of standard storage racks include roller tracks to facilitate access to items stored on the racks. Other variations of these storage racks have shelves which are mounted in an inclined orientation to further ease access to items on the shelves.

The prior art storage racks, however, comprise discrete bays. Because of this design, wires or cables, which are often needed to traverse the bays, must be routed in separate cable ways or wire tracks, which are mounted to the storage racks. Such cable ways or wire tracks increase the material and assembly costs for installing storage racks.

In the copending application, a storage rack which has a wire track beam is disclosed. The beam of the copending application installs by a simple roll-on action and further includes a wire track internal to the beam for routing of wire or cable therethrough.

SUMMARY OF THE INVENTION

This invention provides improvements in design and construction of storage racks. As improved by this invention, the front shelf beams of storage racks can be fabricated as a single channel which spans the length of one or more bays of the rack, which can be installed through a simple roll-on action, and which includes an external wire track for use with an associated electronic or blank panel to route and protect wires which traverse therethrough.

In a preferred construction, the storage rack shelf has a front beam, a rear beam, and side beams. The front beam spans at least two adjacent bays. The front and rear beams are of an inverted generally V-shape, and have a first external lip. The front beam has a second external lip formed by a horizontal and upturned vertical wall to define a wire track for wire or cable traversing a part of, or the entire length of the beam. The rear beam has an internal lip formed by a horizontal and upturned vertical wall. The horizontal walls of he first external lip of the front and rear beams have apertures, spaced at equal distances from each other, along its length.

In the preferred construction, the first external lip of the front and rear beams have a horizontal wall and an upturned vertical wall. The vertical wall has alternating upright generally T-shaped projections and inverted generally T-shaped notches along its length.

In the preferred construction, the second external lip of the front beam has an upturned vertical wall, and further includes an angle plate mounted to the beam, in spaced relation to the upturned vertical wall, to define a space therebetween to accommodate an associated electronic or blank panel.

Roller tracks, dividers, and other similar storage rack accessory items can be disposed between the front and rear beams to facilitate use of the rack.

The preferred arrangement also provides for a plurality of storage rack shelves mounted in horizontal or inclined fashion to front and rear upright support columns to form a storage rack.

These and other objects, features, and advantages of this invention are evident from the following description of the preferred embodiment of this invention with reference to the accompanying drawings.

DETAILED DESCRIPTION OF PREFERRED EMBODIMENTS

Figure 1:
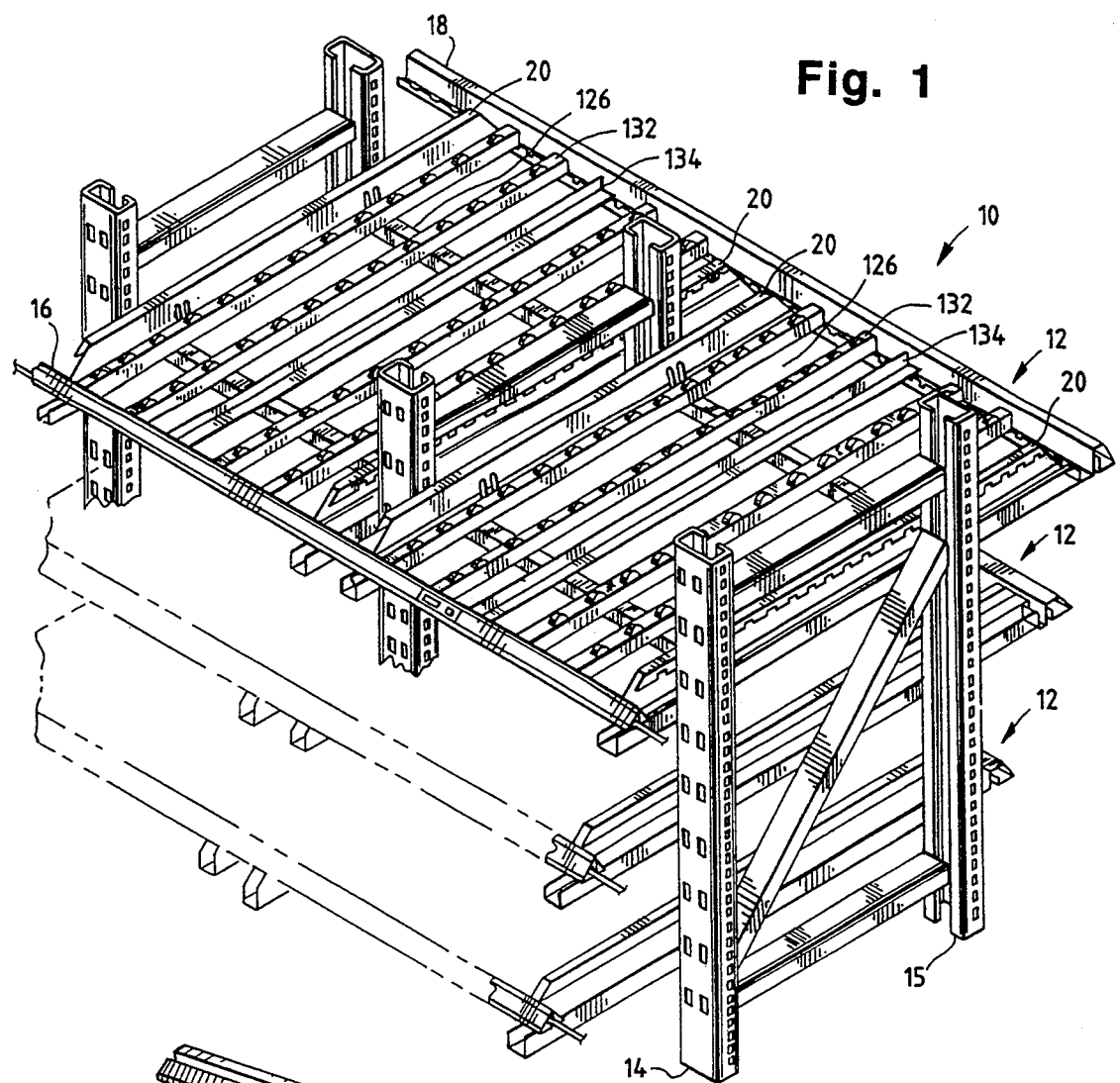
FIG. 1 is a perspective view of a preferred embodiment of a storage rack of the present invention, showing the uppermost shelf with the front and rear beams common among at least two shelves, and the front beam having a readily accessible wire track formed therein.

As shown generally in FIG. 1, a storage rack 10 constituting a preferred embodiment of this invention has a plurality of horizontal, vertically staggered shelves 12 mounted to front and rear upright support columns 14, 15. Each shelf 12 has a front beam 16, a rear beam 18 and at least two side beams 20. As illustrated in FIG. 1, the front and rear beams 16, 18 can span a plurality of bays. Each bay is defined as the storage space between adjacent pairs of support columns 14, 15, on one or more shelves 12.

A front beam 16, shown generally in FIGS, 3 and 4, is an inverted generally V-shaped channel. The front beam 16 has a rear leg 34, forming the rear side of the inverted V-shape. A first external lip 36 extends from the bottom of rear leg 34 and has a horizontal wall 40 which terminates in an upturned vertical wall 42.

The front beam 16 has a second external lip 24 extending from the bottom of the front leg 22. The lip 24 has a horizontal wall 26 terminating in an upturned generally vertical wall 28. The front leg 22 and the second external lip 24 define a wire track 30 external to the front beam 16. The horizontal wall 26 of the front beam 16 has apertures 32, equally spaced from each other, along its length.

Figure 3:
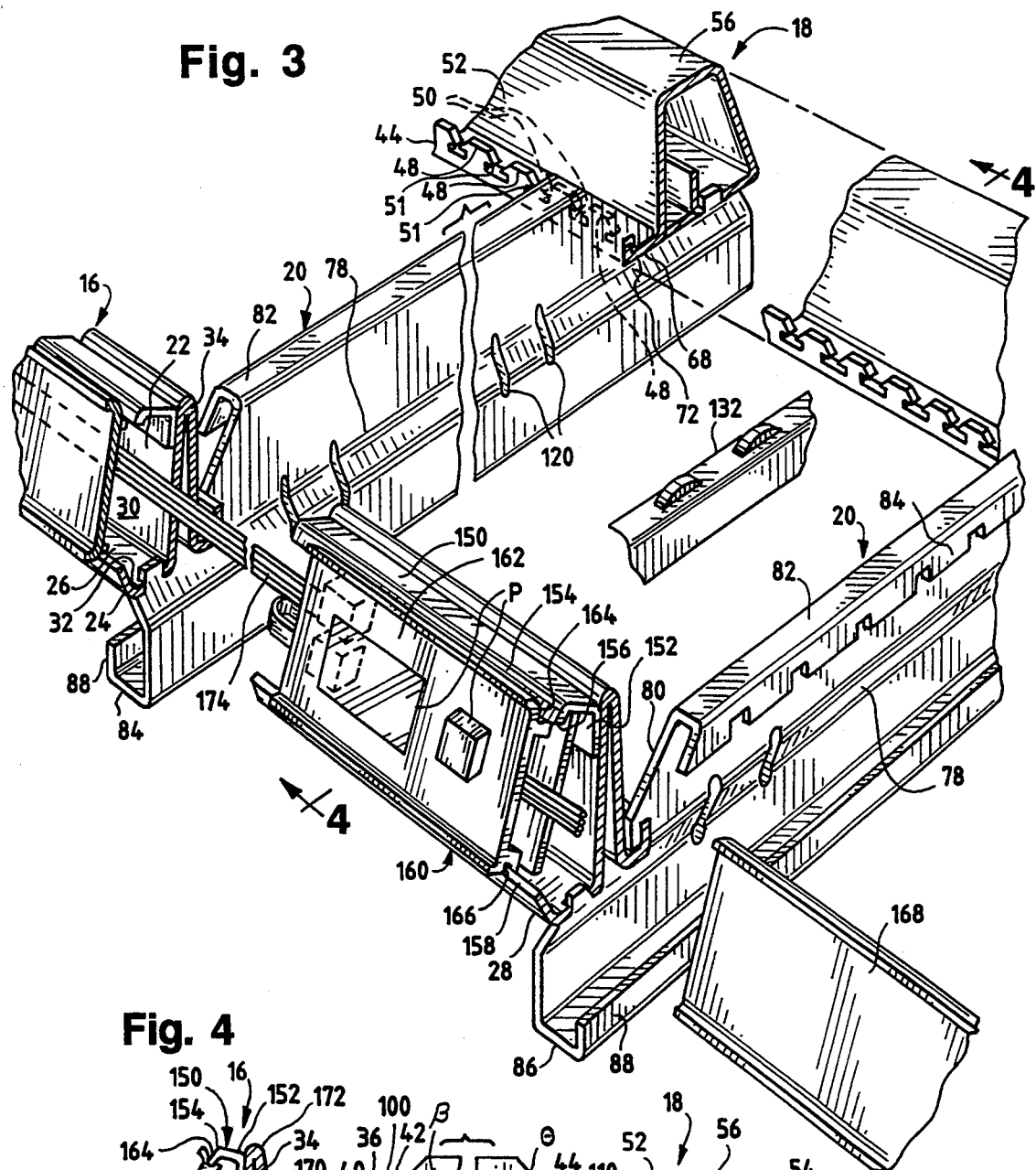
FIG. 3 is a perspective view, in partial cross section, of front, rear and side beams, an electronic panel installed in the front beam, and a portion of wire or cable passing through the wire track of the front beam.
Figure 4:
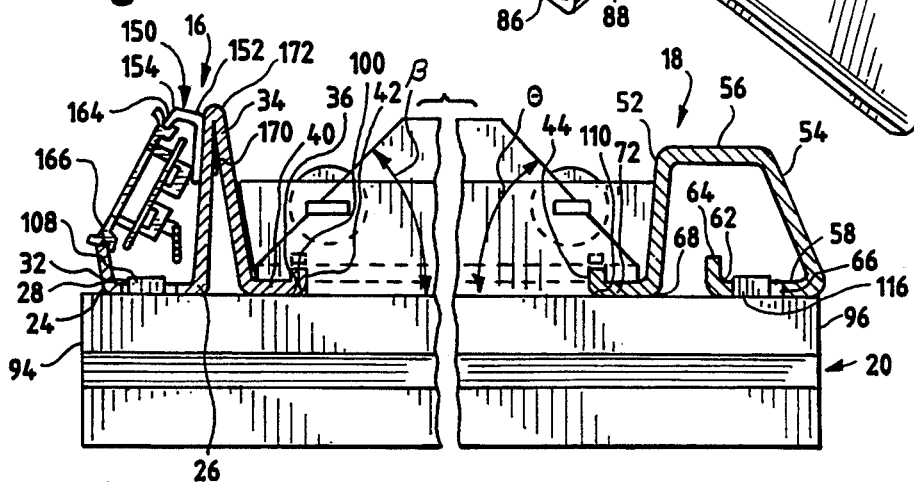
FIG. 4 is a partial cross sectional view taken along line 4—4 of FIG. 3, showing the front and rear beams fully engaged in the side beam, the front beam having the electronic panel installed thereon, and a roller track disposed between the front and rear beams.

The rear beam 18, as best seen in FIGS. 3 and 4 is also an inverted generally V-shaped channel. The rear beam 18 has a front leg 52 and a rear leg 54. An elongated horizontal wall 56 is formed between the front leg 52 and the rear leg 54. The rear beam 18 differs from the front beam 16 in that rear beam 18 has an internal lip 58 extending from the bottom of rear leg 54. The internal lip 58 has a horizontal wall 62 terminating in an upturned vertical wall 64. The horizontal wall 62 has apertures 66, spaced at equal distances from each other, along its length.

The front leg 52 of the rear beam 18 has an external lip 68 extending from the bottom thereof. The external lip 68 has a horizontal wall 72 which terminates in an upturned vertical wall 44. As shown in FIG. 3, which illustrates in detail the upturned vertical wall 44 of the rear beam 18, which is exemplary of the upturned vertical wall (not shown) of the front beam 16, the upturned vertical wall 44 has alternating upright generally T-shaped projections 48 and inverted generally T-shaped notches 50 which form shoulders 51 at the under side of the T-shaped projections 48.

Each side beam 20, shown generally in FIGS. 1, 3 and 4, is a generally C-shaped channel with an offset 78 in the vertical leg 80. The side beam 20 has an upper horizontal wall 82 which terminates in a downturned flange portion 84. Similarly, the side beam 20 has a lower horizontal wall 86 which terminates in an upturned flange portion 88. The downturned flange portion 84 and the upturned flange portion 88 are coplanar. The side beam 20 extends the depth of the shelf 12, and has front and rear portions 94, 96.

As best seen in FIG. 4, the front 94 of side beam 20, above the offset 78, is formed at an angle $\beta$ to the horizontal. In a preferred embodiment, angle $\beta$ is about 45°. A notch 100 is formed in beam 20 at the uppermost point of the offset 78. The notch 100 has a horizontal portion contiguous with an upturned vertical portion extending into the beam 20. A lug 108 extends upward from the offset 78 at a location forward of the notch 100.

The rear portion 96 of the side beam 20 is formed in a like manner to the front portion 94. The rear 96 of side beam 20, above the offset 78, is formed at an angle $\theta$ to the horizontal. In a preferred embodiment, angle $\theta$ is about 45°. A notch 110 is formed in the beam 20 at the uppermost point of the offset 78. The notch 110 has a horizontal portion contiguous with an upturned vertical portion extending into the beam 20. A lug 116 extends upward from the offset 78 at a location rear of the notch 110.

Referring to FIG. 3, the side beam 20 has regularly spaced notches 118 formed along the downturned flange portion 84. The vertical leg 80 of the side beam 20 has vertical slots 120 from a point above the offset 78 to a point below the offset 78.

With reference now to FIGS. 3 and 4, the front beam 16 further includes a lock-in angle plate 150 mounted to the front leg 22, at or near the top thereof. Plate 150 has a first wall 152 which is secured to front leg 22 by bolts 170 which threadedly engage nuts 172 or other suitable fastening means, and a second wall 154 which is formed at an angle to first wall 152. Second wall 154 extends outward from leg 22 and is positioned in spaced relation to external lip 24 to define a space therebetween. In a preferred embodiment, the opposing edges 156, 158 of plate 150 and external lip 24 are contoured.

Figure 2:
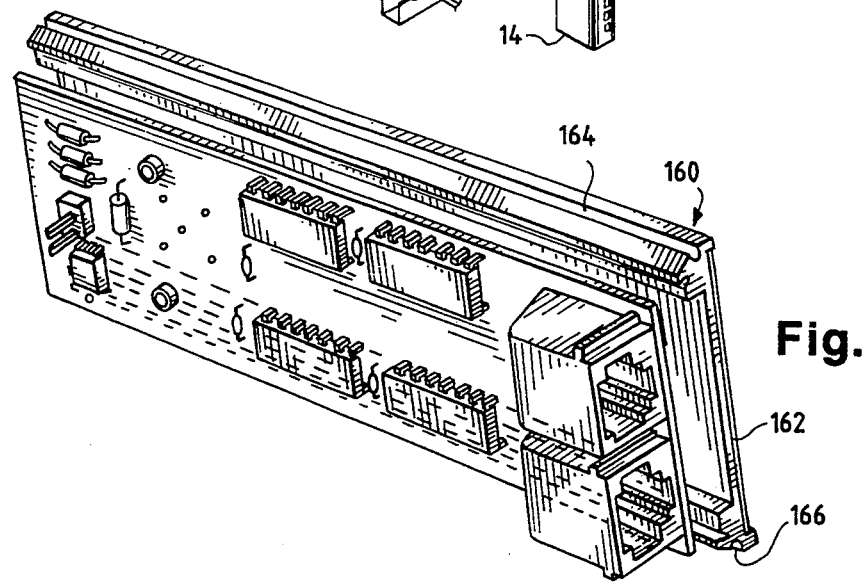
FIG. 2 is a perspective view of an exemplary electronic panel for use with the present invention.

The present invention contemplates using a panel such as the exemplary electronic panel 160 which is shown in FIGS. 2, 3 and 4, and the blank panel 168 shown in FIGS. 3 and 4. Panels 160, 168, cover the wire track 30 to provide protection for the wires routed therein.

In a preferred embodiment, the panel electronic 160 has a faceplate 162 which can accommodate various displays D and control switches such as push-buttons P for inputting, retrieving, and viewing information from an inventory control system for monitoring items stored on the storage rack. In the present form of the invention, electronic panel 160 is electrically connected to other panels (not shown) or to a central monitoring system, by cables or wires 174 which are routed in the beam 16.

In a preferred embodiment, the electronic panel 160 and the blank panel 168 have channelled upper and lower slots 164, 166, which extend along the length of the panels 160, 168, and which are adjacent to the top and bottom edges thereof.

In use, the electronic panel 160 or blank panel 168 is positioned to the side of, and abutted to the front beam so that the upper and lower slots 164, 166, are aligned with the opposing edges 156, 158 of plate 150 and external lip 24. The panels 160, 168, are then slid onto the beam 16 such that the slots 164, 166, are engaged by opposing edges 156, 158, which secures the panel 160, 168, thereon.

Alternatively, the electronic panel 160 and blank panel 168 can be fabricated to snap into place on the front of the beam 16, between lip 24 and angle plate 150, using the same channelled slot 164, 166 design as that used for the slidably mounted panel design disclosed herein.

In either design, electronic panel 160 or blank panel 168 can enclose the entirety or a portion of the wire track 30, while permitting ready access to the track 30 for adding wires, removing wires, or changing connections therein.

The electronic panel 160 and blank panel 168 may be of any type of manufacture, however, it is preferred that the panels 160, 168, be fabricated from aluminum or plastic or the like by an extrusion or other similar manufacturing process.

In assembly of the shelf 12, each front beam 16 is rolled onto the side beam 20 and fully engaged therein as shown generally in FIG. 4. The rear leg 34 of the front beam 16 is held at an angle approximately equal to angle $\beta$, and with one of the inverted generally T-shaped notches 50 of the upturned vertical wall 42 in alignment with the notch 100 of the side beam 20. The front beam 16 is then moved inward, perpendicular to the side beam 20, such that the rear leg 34 lies flush with the top angled portion of the side beam 20. The front beam is then rolled in a downward motion such that the notch 100 of side beam 20 engages lip 36 between two of the upright generally T-shaped projections 48 of the front beam 16, and a lug 108 of side beam 20 extends through one of the apertures 32 of the front beam 16. Each rear beam 18 is rolled onto the side beam in a similar manner.

The electronic panels 160 and blank panels 168 can be installed on the front beam 16 either prior to assembly of the rack 10 or after the rack 10 is assembled. Moreover, because the panels 160, 168, are mounted to the front of the beam 16, mounting can be performed as a modification to the rack 10, after it is in place and in use.

Transverse support members 126 which span between side beams 20, can be used to provide additional support for items on the storage rack 10. The ends (not shown) of the transverse support member 126 have projections which extend outward and downward, and which extend into vertical slots 120 in the side beam 20. A downward force on the transverse member 126 secures it in place relative to the side beam 20.

Optionally, roller tracks 132 and dividers 134 can be mounted in the shelf 12, between the front and rear beams 16, 18. In a preferred construction, the roller tracks 132 and dividers 134 are mounted to the front and rear beams 16, 18 using legs (not shown) as disclosed in Highsmith, U.S. Pat. No. 4,909,402. The legs secure to the front and rear beams 16, 18, by use of clips which engage the shoulders 51 of the beams 16, 18.

A plurality of shelves 12 can be mounted to upright support columns 14 to create layers of shelves. The shelves 12 are mounted to the front and rear upright support columns 14, 15 by methods known in the art. The shelves 12 can be mounted in a horizontal orientation, as shown in FIG. 1, or in an inclined orientation (not shown) to facilitate access to items stored thereon.

From the foregoing it will be observed that numerous modifications can be effected without departing from the true spirit and scope of the novel concepts of the present invention. It will be understood that no limitation with respect to the specific embodiment illustrated herein is intended or should be inferred. It is, of course, intended to cover by the appended claims all such modifications as fall within the scope of the claims.

What is claimed is:

1. A storage rack having a plurality of storage bays, each bay comprising:
    a. a plurality of upright columns including front columns and rear columns;
    b. a plurality of generally horizontally extending vertically spaced shelves within each bay, each said shelf including at least two side beams, a front beam, and a rear beam, each of said side beams having a front portion and a rear portion, at least one of said front and rear portions having a notch extending horizontally therein, at least one of said front and rear beams having a first external lip, said first external lip having notches therein coacting with the notches of said side beams;
    c. at least one of said front and rear beams having a top portion and extending between at least two adjacent bays and having a second external lip terminating in an upturned end wall portion, said second external lip being formed to define a continuous external wire track to establish a path for a wire extending therethrough;
    d. an angle plate mounted to at least one of said front and rear beams, at the top portion thereof, in spaced relation to said upturned end wall portion so as to accommodate a panel therebetween; and
    e. a panel mountable to said front beam and extending along at least a portion thereof, said panel having top and bottom edges, and having means for mounting said panel to said front beam.

2. The storage rack of claim 1 wherein said panel further includes at least one of a display and a control switch.

3. The storage rack of claim 1 wherein:
    a. the first external lip of at least one of said front and rear beams comprises a horizontal wall and an upturned vertical wall, said upturned vertical wall forming alternating upright generally T-shaped projections and inverted generally T-shaped notches along the length of said vertical wall; and
    b. each of said notches of said side beams defines a horizontal portion and a vertical portion, said horizontal portion engaging said horizontal wall of said first external lip of at least one of said front and rear beams, and said vertical portion engaging said inverted generally T-shaped notches of said upturned vertical wall of said front and rear beams.

4. The storage rack of claim 3 wherein roller tracks are disposed between said front and rear beams, said roller tracks having legs engagable with said upright generally T-shaped projections of said front and rear beams.

5. The storage rack of claim 3 wherein at least one divider is disposed between said front and rear beams, said divider having legs engagable with said upright generally T-shaped projections of said front and rear beams.

6. A storage rack having a plurality of storage bays, each bay comprising:
    a. a plurality of upright columns including front columns and rear columns;
    b. a plurality of generally horizontally extending vertically spaced shelves within each bay, each said shelf including at least two side beams, a front beam, and a rear beam, each of said side beams having a front portion and a rear portion, at least one of said front and rear portions having a notch extending horizontally therein, at least one of said front and rear beams having a first external lip, said first external lip having notches therein coacting with one of the notches of said side beams; and
    c. at least one of said front beams extending between at least two adjacent bays, said front beam having a top portion and a bottom portion, said bottom portion having a second external lip extending therefrom being formed to define a continuous external wire track to establish a path for a wire extending therethrough.

7. The storage rack of claim 6 wherein said second external lip further includes an upturned end wall, and said front beam further includes an angle plate mounted to the top portion thereof in spaced relation to said upturned end wall so as to permit mounting of a panel therebetween.

8. The storage rack of claim 7 wherein said angle plate is bolted to said front beam.

9. The storage rack of claim 7 further including a panel mounted thereto, said panel being disposed between said upturned end wall and said angle plate.

10. The storage rack of claim 9 wherein said panel is formed having top and bottom edges and includes at least one channelled slot extending along at least a portion of said panel.

11. The storage rack of claim 10 wherein at least one of said upturned end wall and said angle plate has a contoured edge to accommodate the at least one channelled slot of the panel.

12. The storage rack of claim 11 wherein said panel has two channelled slots, a first channelled slot being formed adjacent the top edge of the panel and a second channelled slot being formed adjacent the bottom edge of the panel, and said upturned end wall and said angle plate have contoured edges to accommodate the channelled slots of the panel.

13. A storage rack having a plurality of storage bays, each bay comprising:
    a. a plurality of upright columns including front columns and rear columns;

b. a plurality of generally horizontally extending vertically spaced shelves within each bay, each said shelf including at least two side beams, a front beam, and a rear beam, each of said side beams having a front portion and a rear portion, at least one of said front and rear portions having a notch extending horizontally therein, at least one of said front and rear beams having a first external lip comprising a horizontal wall and an upturned vertical wall, said upturned vertical wall forming alternating upright generally T-shaped projections and inverted generally T-shaped notches along the length of said vertical wall;

c. each of said notches of said side beams defines a horizontal portion and a vertical portion, said horizontal portion engaging said horizontal wall of said first external lip of at least one of said front and rear beams, and said vertical portion engaging said inverted generally T-shaped notches of said upturned vertical wall of said front and rear beams;

d. at least one of said front and rear beams having a top portion and a bottom portion, and extending between at least two adjacent bays, said at least one of said front and rear beams having a second external lip extending from the bottom portion thereof and terminating in an upturned end wall portion being formed to define a continuous external wire track to establish a path for a wire extending therethrough;

e. an angle plate mounted to at least one of said front and rear beams at the top portion thereof in spaced relation to said upturned end wall portion to accommodate a panel therebetween, said upturned end wall and said angle plate have contoured edges; and f. a panel extending along at least a portion of one of said front and rear beams, said panel having upper and lower channelled slots for engaging the contoured edges of said upturned end wall portion and said angle plate, said panel being formed to accommodate mounting of at least one of a display and a control switch thereon.

\* \* \* \* \*